UNITED STATES PATENT OFFICE.

CHARLES W. TRIGG, OF PITTSBURGH, PENNSYLVANIA, ASSIGNOR TO JOHN E. KING, OF DETROIT, MICHIGAN.

RECOVERY OF AROMAS, &c., ESCAPING DURING COMMINUTION OF COFFEE-BEANS.

1,367,726. Specification of Letters Patent. Patented Feb. 8, 1921.

No Drawing. Application filed May 31, 1918. Serial No. 237,578.

*To all whom it may concern:*

Be it known that I, CHARLES W. TRIGG, a citizen of the United States, residing at Pittsburgh, in the county of Allegheny and State of Pennsylvania, have invented a new and useful Improvement in Recovery of Aromas, &c., Escaping During Comminution of Coffee-Beans, of which the following is a specification.

My process relates to the recovery of the volatile oils, caffeol and aroma during the preparation of roasted coffee beans for leaching, commonly termed crushing, grinding, pulverizing or powdering, and which operations I shall refer to in a generic sense as comminuting.

I have discovered that a very large percentage of the coffee aroma or caffeol escapes during the common grinding operation; in fact, I estimate the percentage as high as 90% of the caffeol in a finely ground coffee prepared to effect most efficient extraction. Of course, it has been commonly noticed that aroma escapes during the grinding or other comminuting operation, but it apparently has not been fully appreciated what a large percentage of loss takes place and no one has attempted to conserve this aroma heretofore. I have further discovered that this aroma that escapes during the grinding or other comminuting operation is virtually the same in its characteristics as that caffeol or aroma which gives the desired scent and flavor to a fresh brew of coffee.

Our process of conserving the aroma which has heretofore been wasted during grinding or comminuting is as follows: The grinding or other comminuting is caused to take place in apparatus which is carefully closed and sealed to prevent the escape of any of these fugitive substances. A current of gas, preferably a neutral or non-oxidizing gas such as nitrogen or carbon-dioxid, is passed through this closed and sealed apparatus. This carries the caffeol or aroma that escapes from the broken coffee beans along with the gas current. The aroma-laden gas is then passed over and into intimate contact with the coffee-extract which has been prepared by any one of numerous processes which have been proposed in the prior art or which we have discovered and disclosed. This coffee-extract may or may not already be charged with aroma that has been saved and added to it from the process of concentrating the coffee infusion to a coffee-extract.

The gas used to bear the aromas away to the extract, of course, may be used over and over again.

Some special aroma retainer, such as lactose, referred to and claimed in a co-pending application, may or may not be used with the extract to assist in catching and retaining the aroma.

It will be evident from the above description that a very high proportion of aroma may be secured in the water-soluble coffee-extract by the use of the process already alluded to. Inasmuch as these aromas are ordinarily lost even in the common way of preparing the coffee brew, it is evident that the source of the aroma for the coffee-extract is greater than the source of aroma for the ordinary coffee infusion. This not only makes up for losses that may be experienced in endeavoring to preserve the aromas escaping during the preparation of the extract but it possibly allows the infusion made from the extract to be charged with a relatively greater proportion of aroma than is the case where the infusion is made from freshly ground coffee.

What I claim is:

1. A process for preserving coffee aroma, which consists of comminuting coffee in a closed apparatus and conveying the escaping aromas from the coffee over a coffee-extract.

2. A process for recovering aroma from the comminuting of coffee beans, consisting of conducting the comminuting in a closed chamber, passing a current of gas through the closed chamber to take the aromas away, and conducting the aroma-laden gas over or in contact with a coffee-extract.

3. A process of recovering the aromas escaping during comminuting of coffee beans, which consists in conducting the comminuting in a closed chamber, the passing of a non-oxidizing gas through the said chamber to bear away the aromas, and leading the said gas into contact with a coffee-extract to allow the extract to take up said aromas.

4. A process of recovering the aromas of coffee escaping during comminuting the beans, which consists in conducting the comminuting in a closed chamber, the passing of a current of non-oxidizing gas through the chamber and over dry powdered coffee-extract to allow the coffee-extract to absorb the aroma.

5. A process for recovering the aromas of coffee escaping during comminuting of the beans, which consists in comminuting the coffee, and conducting the gases laden with the aromas into contact with a substance calculated to catch and retain the aromas.

6. A process for recovering the aromas escaping from coffee during comminuting the beans, consisting of comminuting the coffee, and conducting the aroma-laden medium in which the grinding is done into contact with coffee-extract in a condition calculated to absorb the said aromas.

7. A process for making aromatized water soluble coffee, which consists in preparing a water soluble coffee extract, comminuting roasted coffee beans and conducting the aroma escaping from such comminuting operation into contact with said water soluble coffee extract and allowing the said extract to absorb the aroma.

8. A process for making aromatized water soluble coffee extract, which consists in preparing a water soluble coffee extract, comminuting roasted coffee beans in a closed chamber from which the air is excluded, passing a non-oxidizing gas through said closed chamber to carry away the aromas escaping during comminution, and the conducting of said non-oxidizing aroma-laden gas into contact with said water soluble coffee extract and allowing the said coffee extract to absorb the aroma.

In witness whereof I have hereunto set my hand on the 24th day of May, 1918.

CHARLES W. TRIGG.